Nov. 24, 1953     A. P. DOUGLAS ET AL     2,660,455
GUIDED SUSPENSION MEANS FOR BICYCLE STEERING WHEELS
Filed March 9, 1951     3 Sheets-Sheet 2

INVENTORS,
ALVIN P. DOUGLAS
LEONARD J. WALTERS
BY Albert R. Gohrick

ATTORNEY

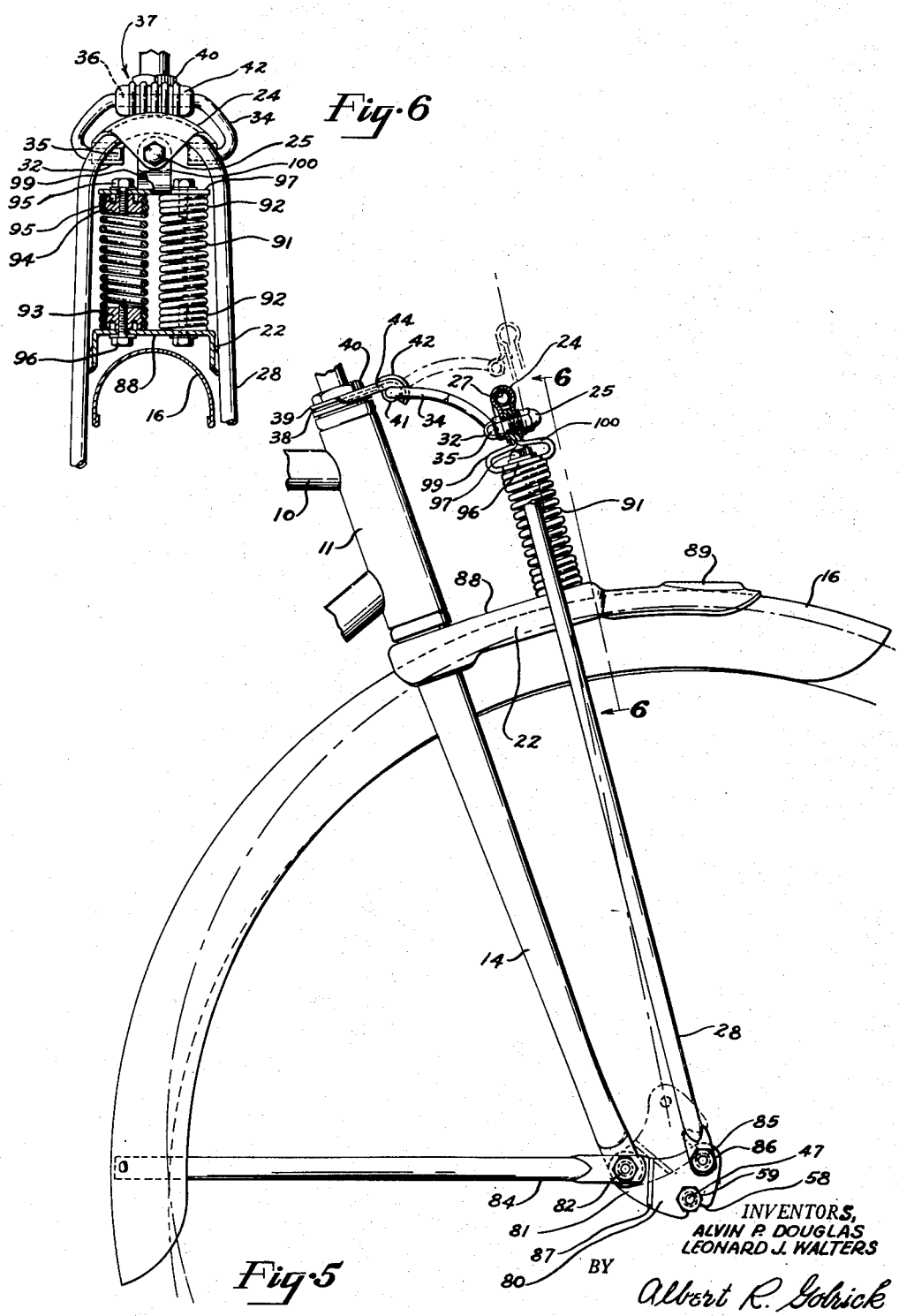

Patented Nov. 24, 1953

2,660,455

UNITED STATES PATENT OFFICE 2,660,455

GUIDED SUSPENSION MEANS FOR BICYCLE STEERING WHEELS

Alvin P. Douglas, Cleveland, and Leonard J. Walters, Shaker Heights, Ohio, assignors to The Murray Ohio Manufacturing Company, Cleveland, Ohio, a corporation of Ohio Application March 9, 1951, Serial No. 214,775

2 Claims. (Cl. 280—277)

The present invention relates to an improved spring suspension structure for a wheel of a bicycle or the like, particularly for a front wheel of a bicycle.

A common spring type wheel suspension used in bicycles and the like comprises a pair of lever links pivoted to the prong ends of a bicycle wheel fork and to lateral members of a structure straddling the wheel and working against a shock-absorbing spring, and a spring mounting structure secured to the fork, the ends of the bicycle wheel axle being secured by axle nuts to the lever links. It has been found that a structure of this type has certain disadvantages, especially for mounting the front wheel of bicycles having the ordinary type of bicycle front wheel axle, hub and bearing structure. After a short period of use with this type of structure, the bicycle tends to develop a front wheel wobble apparently due to loosening of the nuts securing the axle to the lever links, for, when the nuts are taken up, the wobble disappears. However, after further use, the wheel wobble again appears, and take-up of the nuts is effective only two or three times in curing the wobble, which thereafter becomes permanent. Such wobbling in the steering wheel is, of course, quite objectionable.

The present invention substantially eliminates this difficulty. The development of such wobble has been found to be due, in fact, to stretching of the axle, which seems to arise in the following manner. When the wheel passes over an obstacle, in addition to the upward displacement allowed the wheel by the pivoting of the lever links on the fork prongs against the strut structure coupled to the spring, a lateral tilting of the wheel may result from lateral swaying of the strut structure, or from an unequal rise of the lateral members of the strut structure.

Hence, one of the objects of this invention is the provision of a spring suspension structure particularly for bicycle front wheels, which overcomes the tendency to develop wheel wobble and yet is simple, inexpensive, adapted to mass production manufacturing methods, and of neat, compact appearance.

Other objects and advantages of the invention will be apparent from the following description of a preferred form of the invention, reference being made to the accompanying drawings wherein:

Fig. 5 is a view, similar to Fig. 1, of an assembly embodying another form of the invention; and Fig. 6 is a fragmentary front view of the assembly shown in Fig. 5 taken along the line 6—6.

Figure 1:
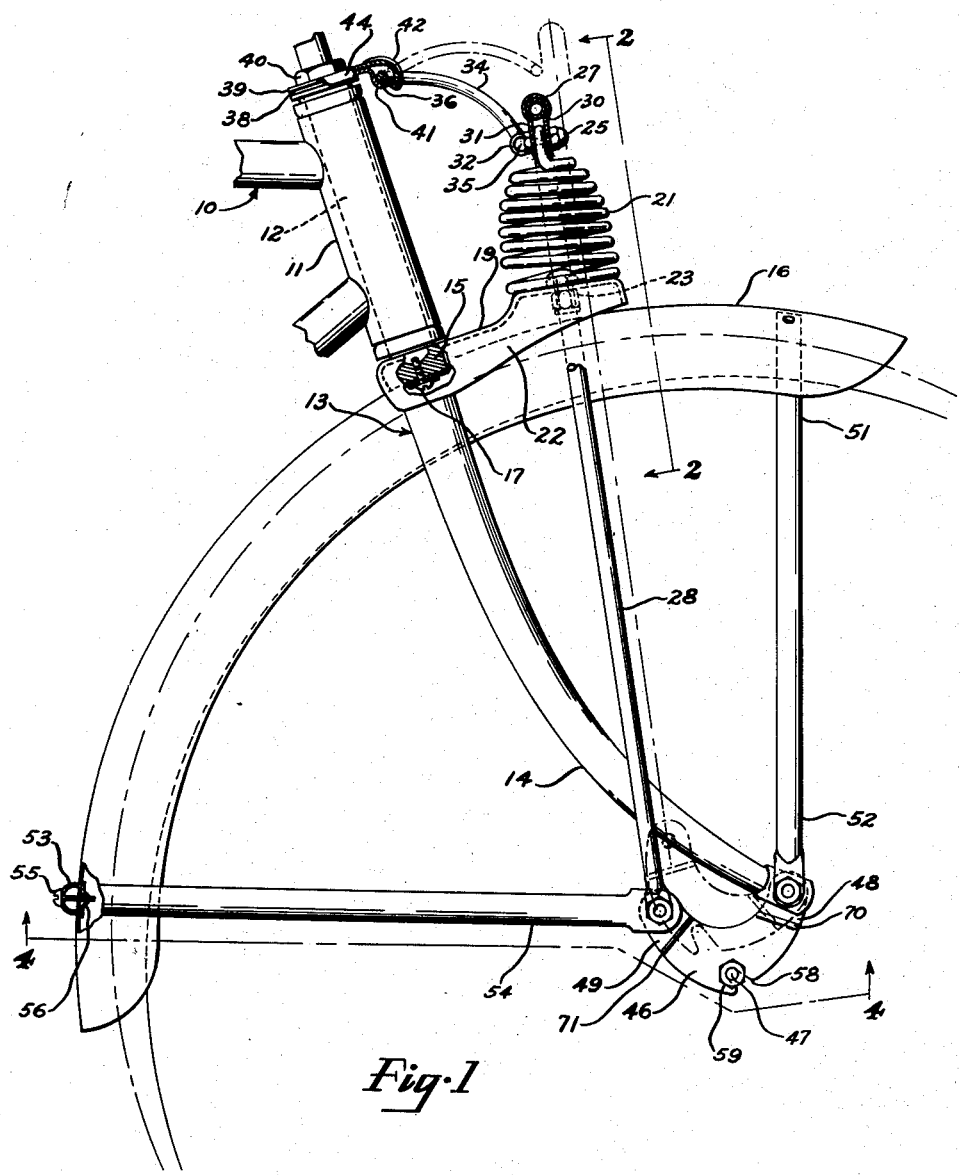
Fig. 1 is a fragmentary side view of a bicycle showing the front wheel assembly.
Figure 2:
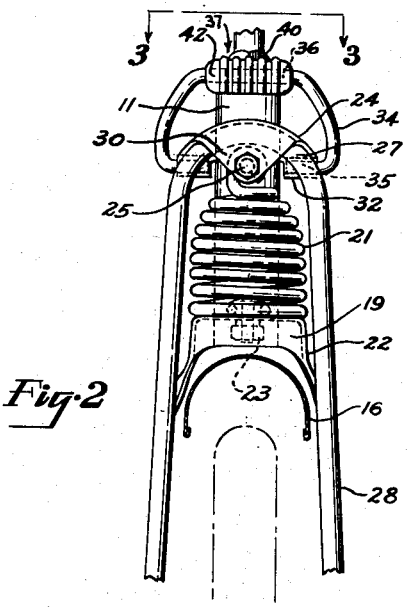
Fig. 2 is a front view, along line 2—2 of Fig. 1, of the spring mounting structure and adjacent structures, certain parts being broken away.
Figure 3:
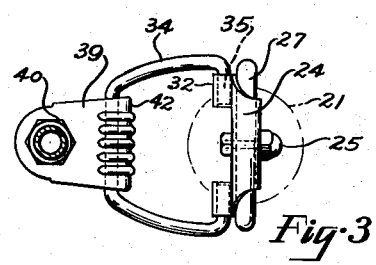
Fig. 3 is a view in section taken substantially along the lines 3—3 of Fig. 2.
Figure 4:
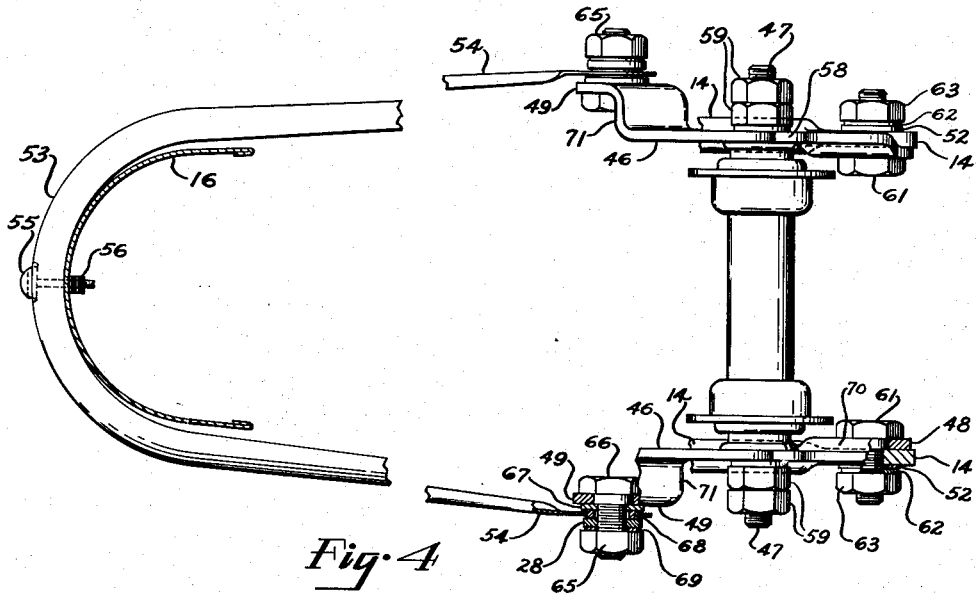
Fig. 4 is a view taken along the line 4—4 of Fig. 1.

In the form of the invention of Figs. 1 to 4 there is shown the front portion of a bicycle having a frame 10 with steering post 11 in which is journaled in the usual manner stem 12 of a steering fork member 13 provided with two fork prongs 14 extending downward from fork-yoke 15 attached to the bottom of the fork stem 12. A fender 16 is secured between fork member prongs 14 to the underside of yoke 15 by a screw 17 while handle bars (not shown) are attached in the usual manner to the upper part of stem 12. The wheel itself is not shown in the drawings, but in Fig. 1 the normal and upwardly deflected positions of the wheel perimeter are merely indicated by the curved lines within the mudguard which are respectively solid and dashed. A heavy gauge sheet metal stamping 19 having an aperture through which stem 12 extends is attached at yoke 15 and it extends forwardly above the fender to serve as a rigid base member for a helical tension spring 21. To confer rigidity, the stamping is formed with a peripherally continuous, downwardly extending flange 22. The rear end of the stamping, including the flange portion, is shaped to conform closely to the adjacent top and side surfaces of yoke 15 and prongs 14 when the base member is slid over the stem into position during assembly to afford a sufficiently large bonding area for brazing the stamping securely to the fork member. The spring 21 is held in position on the upper forward surface of the base member 19 by a nut and bolt 23 passed through a loop in the bottom turn of the spring and through the base member 19. The upper end of the spring is anchored by means of a strut clamp 24 and nut and bolt 25 to the yoke portion of an inverted U-shaped strut member 27 having legs 28 extending downwardly on either side of the fender and front wheel. The clamp 24, formed by stamping and folding heavy sheet metal, is shaped along the fold to receive and closely embrace the yoke portion of the U-shaped strut member 27 and is provided with aligned bolt holes in the front and back portions 30 and 31. A loop in the top end of the spring is held within the clamp 24 by the nut and bolt 25. Spacing washers may be provided on either side of the loop as needed. On the rear portion 31 of the clip there are provided on each side pivot socket structures 32, formed by curling a projection on the stamping into circular shape, for the attachment of a strut restraining and guide member 34. Member 34 is formed from heavy metal rod in a roughly U-shape with the legs thereof curved downwardly and having the ends 35 bent inwardly to be journaled in the pivot socket structures 32 of the strut clamp 24. This strut guiding member is pivotally secured along a straight yoke portion 36 thereof to the upper end of stem post 12 by a clamp structure 37 attached to the upper end of stem 12 above the steering post. This clamp structure comprises lower and upper stamped metal plates 38 and 39 provided with apertures through which the upper end of the steering stem 12 projects, a nut 40 being provided on stem 12 to hold the two stampings in place. The forward end of the lower plate is provided with a transverse trough 41 in which the yoke portion of the strut guide is supported, while the forward end 42 of the upper member curves downwardly over the yoke portion of the strut guide member and the lower plate to hold the guide member in place. The upper plate 39 is also provided with downwardly extending flanges 44 on either side to keep the two plates from shifting relative to each other.

To mount the wheel, a pair of lever link members 46 adapted to receive the ends 47 of the wheel axle are provided, the forward ends 48 of which are pivotally attached to the inner side of the respective fork prongs 14 with the rear ends 49 similarly attached to the lower end of the corresponding legs 28 of the strut member. To the underside of the forward end of the fender is secured the yoke portion of a U-shaped fender brace 51 having the lower end of each leg 52 attached to the outside of the corresponding fork prong, while a rearwardly extending U-shaped fender brace 53 has its yoke portion attached to the outside of the fender and the forward ends of its legs 54 pivotally secured to the link members commonly with the strut legs 28. A bolt 55 passed through the yoke and fender, and secured by a "speed-nut" type fastener 56 provides a flexible attachment of the brace to the fender. The form of the link members and manner of attaching thereto these several structures is clearly shown in Figs. 1 and 4. Each link member is generally crescent shaped, and is provided with bolt holes at the forward and rearward ends 48 and 49 which are laterally offset, respectively, inwardly and outwardly.

The downward bow of the crescent is provided with an upwardly and rearwardly directed slot 58 for the reception of end 47 of the wheel axle, held therein by axle nuts 59. The front end of each link 46 is placed inside the lower end of the corresponding fork prong 14 and bolts 61 are passed through the links, the fork prongs 14, the lower end of legs 52 of the forward fender brace 51, and washers 62 and held by nuts 63 to serve as pivots for the links.

A nut 65 and bolt 66, passed successively through the rear end 49 of each link, washer 67, sleeve 68 in the forward end of fender brace leg 54, lower end of strut leg 28 and washer 69, holds the link, lower fender brace 53 and strut leg 28 together in pivotal relation on each side.

The dashed lines in Fig. 1 represent the limiting position which the wheel and the several parts of the shock-absorbing spring suspension structure can attain when the wheel passes over an obstacle. The shoulders 70 and 71 formed by offsetting the ends of each link member 46 may serve as stops in coming against the edge of the fork prong 14 when the wheel is displaced upwardly. By the provision of the strut member guide 34 pivoting on the fork structure and pivotally attached to the strut 27 through pivot sockets 32, a means is supplied to constrain the strut member 27 to move upwardly without lateral tilting during shock absorbing action, which in turn ensures parallel movement of the link members to prevent tilting, and consequent stretching, of the axle.

In addition to the mechanical functions performed in the wheel suspension or shock absorbing mechanism, the several parts may be shaped to have a decorative effect individually and in ensemble. Thus, for example, as may be seen in Figs. 1 to 4, a design may be formed in the stamping of upper plate 39, the base member 19 is shaped to conform to the fender lines and to the tension spring base, and the strut guide 34 is curved rather than having straight legs of harsher visual effect.

In the form of the invention shown in Figs. 5 and 6, wherein like numerals are used to designate parts like to those of Figs. 1 to 4, the general construction is basically the same as in the first form. Here, however, the prongs 14 of the fork member are substantially straight, and link members 80 extend forward therefrom, and swing upward in front of the prongs when displaced in the shock absorbing action. The inwardly offset and perforated rear end 81 of each link member is pivotally secured to the inside of the fork prong end by a nut and a bolt 82 which also hold the corresponding leg of the rearwardly extending U-shaped fender brace 84. Each end 47 of the axle is held in the axle slot 58 by axle nuts 59 as in the first form. The perforated forward end 86 of the link member 80, which here is not offset, is pivotally coupled to the bottom of the corresponding leg 28 of the shock-absorber strut member 27 by a nut and bolt 86. The shoulders 87, formed by the offsets, in coming to bear against the front edge of the fork prongs, here serve as stops limiting the upward deflection of the wheel suspension structure.

The platform-like spring base member 88 is essentially the same in construction, function and manner of attachment to the wheel fork member as in Figs. 1 to 4. However, as here shown, a forward extension 89 is provided to mount accessories, such as a spot light. Likewise, the strut clamp 24, the strut guide member 34, and the clamping plates 38 and 39 for the yoke of the strut guide are all formed and connected like the corresponding parts in Figs. 1 to 4 as above described. In place of a single spring of Figs. 1 to 4, secured directly to the spring base member and to the spring clamp, there is provided a pair of springs 91 disposed side by side. The lower and upper ends of each of these springs have a close wound portion 92 into which are screwed lower and upper externally threaded plugs 93 and 94, each plug having a threaded central bore and a pair of recesses 95 for the application of a wrench. The tension springs 91 are each secured to the base member 88 by a bolt 96 extending through the base member into the central bore of each lower plug 93, while the upper end of each spring is secured to a transverse spring anchor plate 97 by a bolt 98 threaded into the central bore of each upper plug 94. The strut clamp 24 is secured to the yoke of strut member 27 and the spring anchor plate 96 by a nut and bolt 25 passed through the strut yoke clamp and the upwardly extending perforated lugs formed by bending extensions 99 and 100 of the anchor plate to bring the ends adjacent.

It will be understood that other forms of the invention may be adopted, falling within the scope of the following claims.

We claim:

1. For a bicycle and the like having a forked member between the prongs of which a wheel is disposed and having a fork stem member journaled in the steering post of the bicycle, a spring suspension structure for the wheel comprising a platform-like base member rigidly attached to said forked member and extending therefrom above the wheel, tension spring means having a lower end secured to said base member, an inverted U-shaped strut member having its legs straddling the wheel, a strut clamp secured to the yoke portion of said U-shaped strut member and also secured to the upper end of said spring means, a strut guide member of generally U-shape interposed between said strut member and said forked member to restrain the strut member from lateral deflection, said guide member having a yoke portion pivotally attached to the forked member and legs having laterally bent ends adapted for insertion in pivot sockets provided on said strut clamp, means carried on the said fork stem above the steering post for pivotally supporting the yoke portion of said guide member, and a pair of link members each pivotally interconnecting the end of one fork prong and the end of a corresponding leg of said strut member, said link members being substantially parallel and having the wheel mounted therebetween.

2. For a bicycle and the like having a forked member between the prongs of which a wheel is disposed and having a fork stem member journaled in the steering post of the bicycle, a spring suspension structure for the wheel comprising a platform-like base member rigidly attached to said forked member and extending therefrom above the wheel, tension spring means having a lower end secured to said base member, an inverted U-shaped strut member having its legs straddling the wheel, a strut clamp secured to the yoke portion of said U-shaped strut member and also secured to the upper end of said spring means, a strut guide member of generally U-shape interposed between said strut member and said forked member to restrain the strut member from lateral deflection, said guide member having leg ends bent into alignment with each other and a yoke end portion parallel to said leg ends to provide parallel pivot portions at opposite ends of the guide member, means carried on the said fork stem above the steering post and means on said strut clamp for pivotally supporting the said pivot portions of said guide member, and a pair of link members each pivotally interconnecting the end of one fork prong and the end of a corresponding leg of said strut member, said link members being substantially parallel and having the wheel mounted therebetween.

ALVIN P. DOUGLAS.
LEONARD J. WALTERS.

References Cited in the file of this patent

UNITED STATES PATENTS

| Number | Name | Date |
|---|---|---|
| 1,132,829 | Cobb | Mar. 23, 1915 |
| 1,527,133 | Harley | Feb. 17, 1925 |
| 2,537,679 | Kraeft | Jan. 9, 1951 |

FOREIGN PATENTS

| Number | Country | Date |
|---|---|---|
| 607,559 | Great Britain | Sept. 1, 1948 |
| 892,635 | France | Jan. 13, 1944 |